US006409455B2

(12) United States Patent
Moseley

(10) Patent No.: US 6,409,455 B2
(45) Date of Patent: *Jun. 25, 2002

(54) WHEELED ELEVATOR FOR TRANSFERRING FREIGHT INTO OR OUT OF AN ENCLOSED TRUCK

(75) Inventor: John F. Moseley, Ormond Beach, FL (US)

(73) Assignee: Superior Handling Equipment, Inc., Ormond Beach, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/511,297

(22) Filed: Feb. 23, 2000

(51) Int. Cl.[7] .................................................. B65G 69/32

(52) U.S. Cl. ........................ 414/495; 414/537; 414/917; 414/391; 414/398; 414/399; 414/347; 254/10 R

(58) Field of Search ................................ 414/347, 495, 414/399, 398, 987, 390, 917, 537, 373, 546, 391, 395, 921, 556; 254/10 R, 2 R, 10 C

(56) References Cited

U.S. PATENT DOCUMENTS 3,888,463 A * 6/1975 O'Brien et al. ......... 414/921 X
4,425,069 A * 1/1984 Saur et al. .................. 414/398
4,923,357 A * 5/1990 Isogai ........................ 414/495
5,275,526 A * 1/1994 Moseley ..................... 414/495
5,716,184 A * 2/1998 Lowe et al. ............ 414/399 X

FOREIGN PATENT DOCUMENTS

FR 11 87147 * 9/1959 ................. 414/495
JP 0175329 * 8/1987 ................. 414/398
JP 405208731 A * 8/1993 ................. 414/398
WO WO 90/06892 * 6/1990 ................. 414/398

* cited by examiner

*Primary Examiner*—Frank E. Werner
(74) *Attorney, Agent, or Firm*—Arthur G. Yeager

(57) ABSTRACT

A wheeled elevator apparatus for use in transferring freight between a highway truck and a freight storage dock or building, the apparatus including an elevatable platform powered by hydraulic cylinder means and including two oppositely directed ramps hingedly connected to said platform to provide access to said platform for pallet jacks moving pallets of freight, one of said ramps being long enough to reach inside the highway truck to form a bridge from the elevatable platform to the highway truck, the bridge having side curbs and being sufficiently narrow and laterally off-set to permit an independently operated roller, skate-wheel, or belt conveyer to function simultaneously beside the elevatable platform for moving small individual packages of freight between the same building or dock and the same truck.

20 Claims, 3 Drawing Sheets

WHEELED ELEVATOR FOR TRANSFERRING FREIGHT INTO OR OUT OF AN ENCLOSED TRUCK

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to a wheeled elevator platform used to load or unload unitized freight onto or from a highway truck at the same time as smaller individual cases or packages of freight are loaded or unloaded by way of a nonelevatable conveyor, e.g. a roller conveyor, a skate-wheel conveyor, or a belt conveyor.

2. Description of the Related Art

Roller, skate-wheel, and belt conveyors are well known devices that have been used for many years to transport freight from one level to another by the use of gravity or motorized means to move the freight up or down an inclined plane. Simularly, elevatable platform docklift conveyors on wheels are well known devices used to transfer unitized loads of freight from one level to another. Applicant has patented two of such devices; namely, U.S. Pat. Nos. 5,275,526 and 5,333,340. These two basic types of conveyors have not been used together to load or unload freight between a transport truck and a freight storage building because there generally is not enough lateral space to accomodate and use both conveyors at the same time at or near the rear door of the enclosed truck.

BRIEF SUMMARY OF THE INVENTION

This invention relates to a movable, wheeled, device with an elevatable platform and with hingedly attached access ramps, the platform being adapted to transfer freight, preferably in the form of pallets upon which individual cases or smaller packages of freight have been stacked to form a unitized load with the truck ramp or bridge being slenderized and shaped sufficiently to permit the simultaneous independent operation of an inclined roller, skate-wheel, or belt conveyor to transfer small individual cases or packages of freight while the pallets with a plurality of stacked cases of unitized freight are moved via the elevatable platform of this invention. The freight being moved by these two means generally is tranferred between the same two levels, although that is not a necessary limitation to this invention.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof,may best be understood by reference to the following description taken in connection with the accompanying drawings in which:

DETAILED DESCRIPTION OF THE INVENTION

This invention is a special adaptation of wheeled, elevatable platforms, which are generally similar to those described in applicant's prior U.S. Pat. Nos. 5,275,526 and 5,333,340; and U.S. patent application Ser. No. 09/419,548, filed Oct. 18, 1999, now U.S. Pat. No. 6,357,990. The same basic elevatable platform described in those prior patents and in that patent application is employed herein for loading and/or unloading freight to and from highway trucks and freight storage buildings where truck height docks are not feasible.

Figure 1:
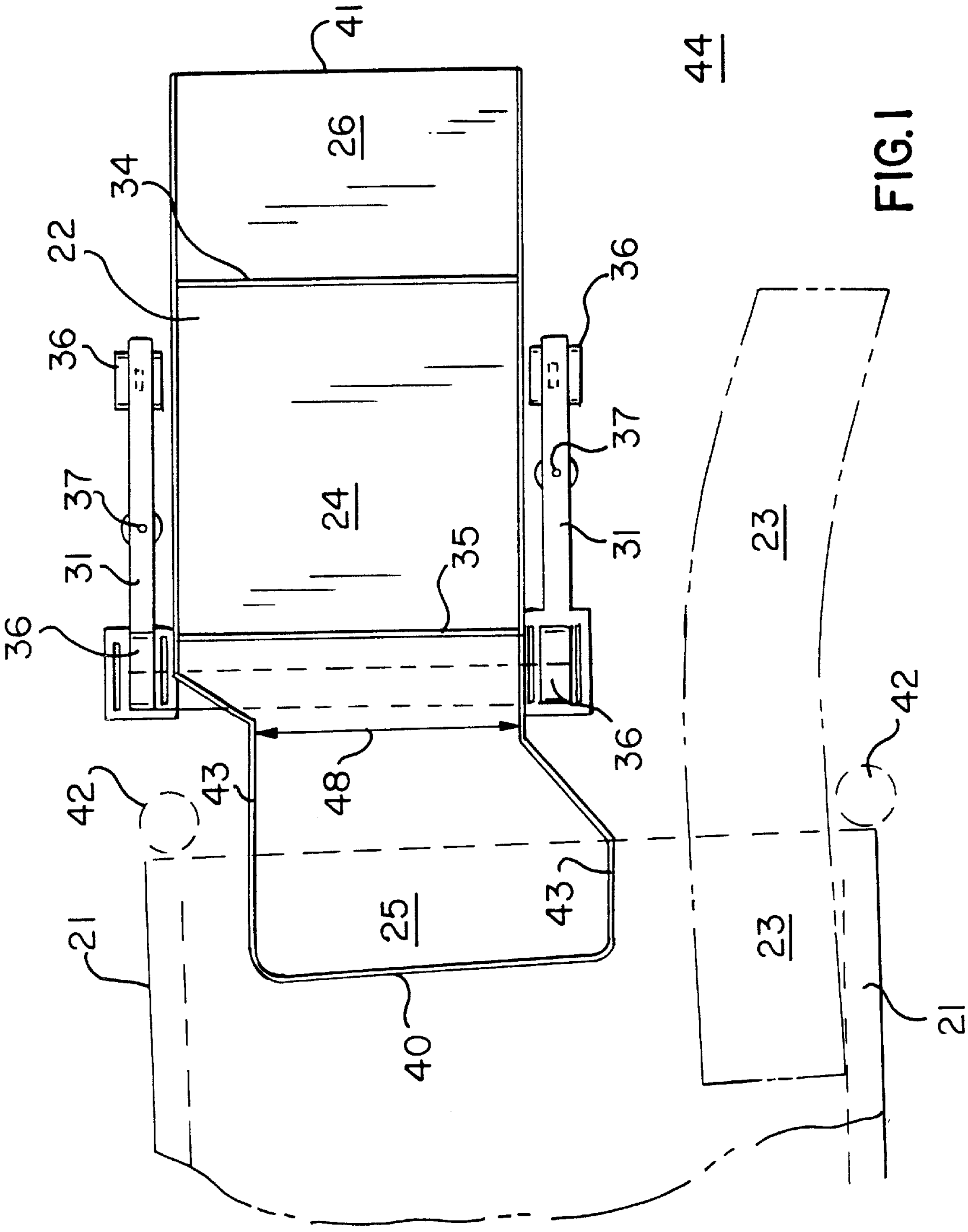
FIG. 1 is a top plan view of the elevatable platform of this invention as it might be employed along with a roller, skate-wheel, or belt conveyor to load or unload a truck.
Figure 2:
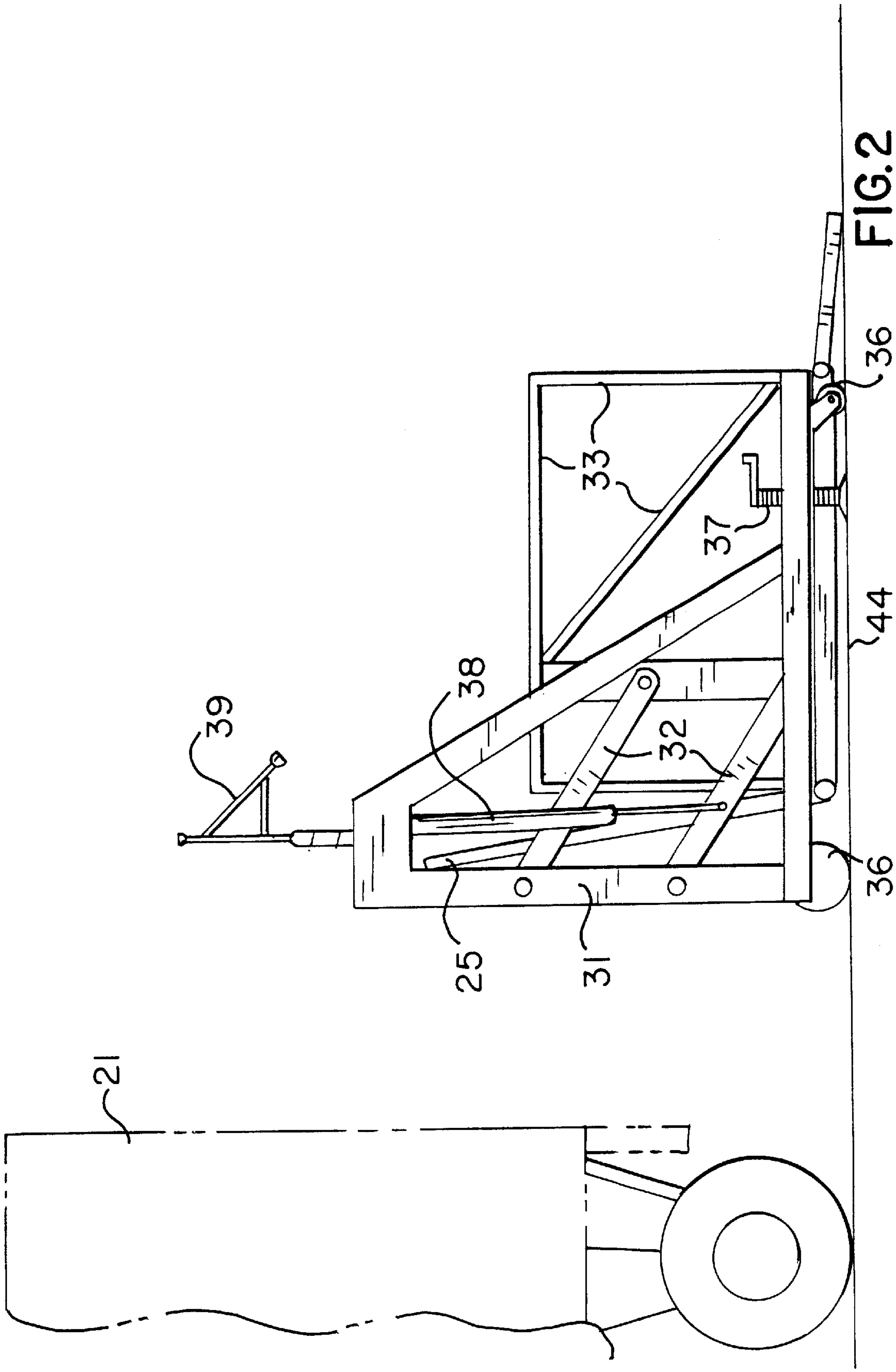
FIG. 2 is a side elevational view of the elevatable platform of FIG. 1 (omitting the roller, skate-wheel, or belt conveyor) in its lower position)
Figure 3:
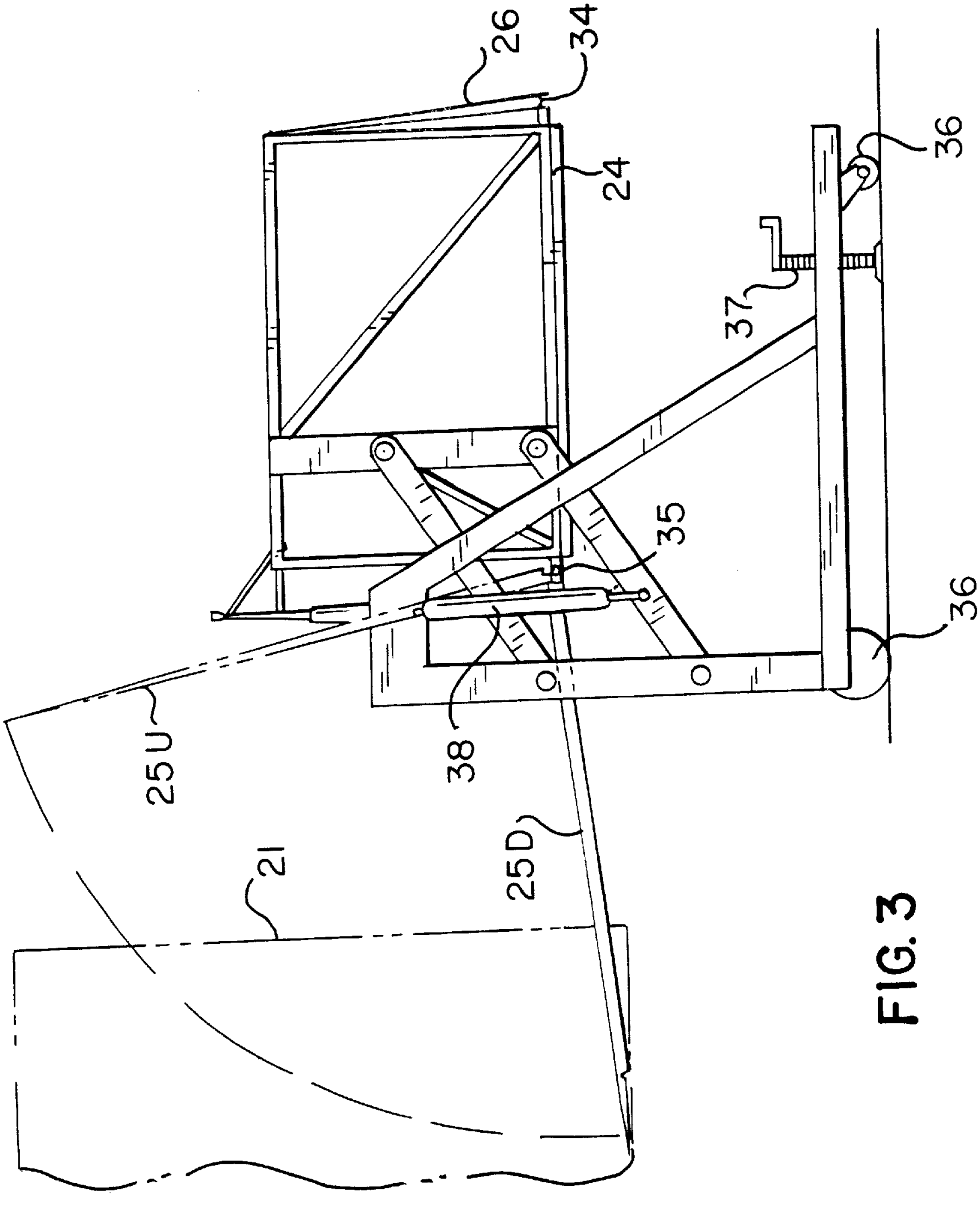
FIG. 3 is a side elevational view of the elevatable platform of FIG. 1 (omitting the roller, skate-wheel, or belt conveyor) in its raised upper position at truck floor height.

In FIG. 1 there is shown an overhead plan view of the elevatable platform having three specific sections. The central section 24 is the elevatable platform. Sections 25 and 26 are ramps that are hingedly connected to platform 24 of the wheeled docklift elevator of this invention. Ramp 25 is a long bridge structure, measured from its hinge 35 to its outside end 40, and is employed to reach or bridge from the raised platform 24 to the inside floor of a truck or a raised dock where freight is already stored or is to be stored. Ramp 26 has a short length measured from its hinge 34 to its outside end 41, and is employed as an access means to platform 24 from the ground level upon which the elevatable platform apparatus of this invention sits when lowered. Ramp 25 is the principal portion of this invention which distinguishes it from other wheeled elevatable platforms known previously. The ramp 25 is offset to one side from hinge 35 to the end at 40 instead of having straight sides from hinge 35 to 40 as is the case with prior art apparatus. Ramp 25 is also narrower from side-to-side than platform 24 in the direction 43. This feature together with the beforementioned off-set toward one side permits off-setting the entire docklift so as to leave room for a gravity roller, skate-wheel, or belt conveyor 23 to fit alongside the wheeled elevatable platform of this invention. The portion of the ramp 25 close to hinge 35 may be narrowed and angled sufficiently to avoid the building wall at the side of a door or a door guard post 42 or some other obstruction; although the width of ramp 25 may not be less than the width of platform 24 where the two are joined by hinge 35. Ramp 25 may be made to be the same narrow width over its entire length, or it may be widened near its end at 40 where it extends into the truck or dock 21 where the freight is being loaded or unloaded. Thus, the exact shape of ramp 25 may vary from machine to machine depending on the obstructions that must be avoided at each dock. Thus an elevatable platform of this invention may be tailored to be used at a particular dock, while that platform might not be appropriate for use at another dock. The wide end of ramp 25 as shown in FIG. 1 at 40 is desirable in that it makes it easier for the workman to maneuver a pallet jack onto ramp 25 from a crowded truck interior. As an added safety feature it is preferable that the lateral edges of ramp 25 be fitted with curbs or vertical short walls that are tall enough to deflect a wheel of a pallet jack and yet not so tall as to catch on any part of a raised pallet passing over or above the curbs. The height of such a curb or wall can be approximately 1.5 inches to accomplish this purpose. The above-described wheeled platform and roller skate wheel or belt conveyer can be combined for use with a closed van highway truck having a rear lateral door opening of about 90–96 inches. This opening will accomodate a ramp 25 having an outside end access 40 of about 54 inches, which leaves space for the simultaneous use of roller, skate-wheel, or belt conveyer 23 that is about 18 inches wide and spaces of 6–8 inches between the truck wall and the roller conveyer, 6–8 inches between the conveyer and docklift ramp 25, and another 6–8 inches between ramp 25 and the opposite wall of truck 21. It should be obvious that this invention is suitable for any reasonably long ramp 25 of any reasonable shape from hinge 35 to ramp end 40, which accomodates the operation of the docklift simultaneously with a roller, skate-wheel, or belt conveyor alongside. The width of ramp 25 should be about 40–60 inches to accomodate the pallet jacks which carry pallets that are about 40–45 inches wide. The actual length of ramp 25 may vary from about 45 to about 76 inches or more. The actual shape of ramp 25 may be slightly curved or entirely angular so long as the shape permits safe and easy handling of the palletized freight alongside of the roller, skate-wheel, or belt conveyor. Generally a gently curving shape is preferred, if some obstructionis to be avoided. In the absence of such obstructions and the presence of a need to off-set the entire docklift to make room for the roller, skate-wheel, or belt conveyor, an in-line straight ramp 25 would be preferred. This invention is particularly useful where there is a need to employ a docklift elevator and a roller, skate-wheel, or belt conveyor simultaneously and to use them independently of each other. Platform 24 should be of a size that is suitable to transport hand- or powered-pallet jacks carrying palletized loads of freight, e.g. at least 60 inches wide and 84 inches long. Ramp 26 should be the same width as that of platform 24, but only needs to be long enough to reach the ground level 44 at a convenient angle, i. e. 34 to 41 inches for a platform that is about 4 inches above the ground level at its lowest position.

The remaining structure of the wheeled elevatable platform of this invention is essentially the same as that shown in U.S. Pat. Nos. 5,275,526 and 5,333,340 and U.S. patent application Ser. No. 09/419,548, filed Oct. 18, 1999, now U.S. Pat. No. 6,357,990. The structure indicated at 31 in the enclosed drawings includes a steel framework on wheels 36 having a plurality of screw jacks 37 which can be lowered from their normal movable position to support and stabilize the entire weight of the platform of this invention, lifting arms 32 and hydraulic cylinder 38 to raise and lower platform 24, a safety railing 33 around platform 24, and suitable controls 39 to operate the wheeled elevatable docklift platform of this invention.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A movable wheeled apparatus for transferring freight between a high level and a low level to and from a truck and a conveyor for transferring freight between the high and the low level to and from the truck, said movable wheeled apparatus comprising a base frame structure moving on the low level, an elevatable platform pivotally coupled to said base frame structure for receiving a load from the high or the low level, lifting means for lifting said elevatable platform between the low level and the high level, said elevatable platform including first and second access ramps hingedly connected to said elevatable platform, said first access ramp being extended when said platform is at the high level, said second access ramp being extended when said platform is at the low level, and said first access ramp having a base portion, an intermediate portion and a forward end portion, wherein said first access ramp includes first and second sides, said first side having a part offset inwardly toward a centerline of said elevatable platform, and said second side having a part offset outwardly away from said centerline to permit simultaneous loading and unloading of the truck by transfer means operating on said elevatable platform of said movable wheeled apparatus and the conveyor adapted to be located between said second side and a sidewall of the truck.

2. The apparatus of claim 1 wherein said first access ramp includes upstanding curb edges substantially along both said sides of said first access ramp to prevent a loading pallet jack from rolling off said first access ramp without impeding passage above said curb edges of a raised pallet on the jack.

3. The apparatus of claim 1 wherein said first access ramp includes the base portion, the intermediate portion and the forward portion, said base portion having a width substantially equal to a width of said elevatable platform, said intermediate portion having non-parallel straight sides offset respectively inwardly and outwardly of said centerline.

4. The apparatus of claim 1 wherein said first access ramp includes the base portion, the intermediate portion and the forward portion, said base portion having a width substantially equal to a width of said elevatable platform, said intermediate portion having at least one of its sides offset inwardly to accommodate for an obstruction between high and low levels, and said first and second sides including forward portion sides respectively offset outwardly and inwardly of said centerline.

5. The apparatus of claim 1 wherein a width of an other free edge of said forward portion is substantially equal to a width of said elevatable platform.

6. The apparatus of claim 1 wherein said first side includes an inclined side portion extending inwardly of said centerline.

7. The apparatus of claim 1 wherein said second side includes an inclined side extending outwardly of said centerline.

8. The apparatus of claim 1 wherein said forward portion includes a pair of substantially parallel side portions.

9. The apparatus of claim 1 wherein said intermediate portion includes side edge portions that are offset in generally the same direction.

10. The apparatus of claim 1 wherein said sides of said first access ramp are offset in the same lateral direction while maintaining a width of a forward free end portion of said first access ramp substantially equal to a width of said elevatable platform.

11. A movable wheeled apparatus for transferring freight between high and low levels to and from a truck and a conveyor for transferring freight between the high and the low level to and from the truck, said movable wheeled apparatus comprising a base frame structure moving on the low level, an elevatable platform pivotally coupled to said base frame structure for receiving a load from the high or low level, means for lifting said elevatable platform, said elevatable platform including first and second access ramps hingedly connected to said elevatable platform, said first access ramp being extended when said platform is at the high level, said second access ramp being extended when said platform is at the low level, wherein said first access ramp includes first and second sides, said first and second sides having a part offset with respect to a centerline of said elevatable platform to provide a smaller ramp part on one side and a larger part on another side of said centerline to permit simultaneous loading and unloading operation of the truck by transfer means operating on said elevatable platform of said movable wheeled apparatus and the conveyor adapted to be located adjacent a sidewall of the truck.

12. A movable wheeled apparatus for transferring freight between a high level and a low level and a conveyor is disposed between the high and the low level, said movable wheeled apparatus comprising a base frame structure moving on the low level, an elevatable platform pivotally coupled to said base frame structure for receiving a load from the high or low level, lifting means for lifting said elevatable platform between the low level and the high level, said elevatable platform including first and second access ramp hingedly connected to said elevatable platform, said first access ramp being extended when said platform is at the high level, said second access ramp being extended when said platform is at the low level, wherein said first access ramp has first and second sides, said first and second sides having a part offset with respect to a centerline of said elevatable platform, said first access ramp having three continuous portions, a base portion, an intermediate portion and a forward portion, said forward and intermediate portions provide a smaller ramp part on one side and a larger ramp part on another side of said centerline to permit simultaneous loading and unloading operation of said elevatable platform of said movable wheeled apparatus and the conveyor adapted to be located alongside said wheeled apparatus.

13. The apparatus of claim 12 wherein said base portion having a width substantially equal to a width of said elevatable platform said intermediate portion having non-parallel straight sides offset respectively inwardly and outwardly of said centerline.

14. The apparatus of claim 12 wherein said base portion having a width substantially equal to a width of said elevatable platform, said intermediate portion having at least one of its sides offset inwardly to accommodate for an obstruction between the high and low levels, and said first and second sides including forward portion sides respectively offset outwardly and inwardly of said centerline.

15. The apparatus of claim 12 wherein a width of an outer free edge of said forward portion is substantially equal to a width of said elevatable platform.

16. The apparatus of claim 12 wherein said first side includes an inclined side portion extending inwardly of said centerline.

17. The apparatus of claim 12 wherein said second side includes an inclined side extending outwardly of said centerline.

18. The apparatus of claim 12 wherein said forward portion includes a pair of substantially parallel side portions.

19. The apparatus of claim 12 wherein said intermediate portion includes side edge portions that are offset in generally the same direction.

20. The apparatus of claim 12 wherein said sides of said first access ramp are offset in the same lateral direction while maintaining a width of a forward free end portion of said first access ramp substantially equal to a width of said elevatable platform.

* * * * *